(12) United States Patent
Ruf et al.

(10) Patent No.: US 12,355,119 B2
(45) Date of Patent: Jul. 8, 2025

(54) FUEL RECIRCULATION IN A FUEL CELL DEVICE HAVING A PLURALITY OF FUEL CELL STACKS

(71) Applicant: AUDI AG, Ingolstadt (DE)

(72) Inventors: Markus Ruf, Waldstetten (DE); Hannah Staub, Karlsdorf-Neuthard (DE)

(73) Assignee: AUDI AG, Ingolstadt (DE)

(*) Notice: Subject to any disclaimer, the term of this patent is extended or adjusted under 35 U.S.C. 154(b) by 355 days.

(21) Appl. No.: 17/999,025

(22) PCT Filed: Oct. 14, 2021

(86) PCT No.: PCT/EP2021/078458
§ 371 (c)(1),
(2) Date: Nov. 16, 2022

(87) PCT Pub. No.: WO2022/084144
PCT Pub. Date: Apr. 28, 2022

(65) Prior Publication Data
US 2023/0238551 A1 Jul. 27, 2023

(30) Foreign Application Priority Data
Oct. 19, 2020 (DE) ............ 10 2020 127 469.6

(51) Int. Cl.
*H01M 8/04089* (2016.01)
*H01M 8/04082* (2016.01)
(Continued)

(52) U.S. Cl.
CPC ... *H01M 8/04097* (2013.01); *H01M 8/04201* (2013.01); *H01M 8/04225* (2016.02); *H01M 8/04228* (2016.02); *H01M 2008/1095* (2013.01)

(58) Field of Classification Search
CPC ......... H01M 8/04097; H01M 8/04225; H01M 8/04228; H01M 8/04201; H01M 2008/1095
See application file for complete search history.

(56) References Cited

U.S. PATENT DOCUMENTS

2010/0047641 A1  2/2010  Jahnke et al.

FOREIGN PATENT DOCUMENTS

CN   110828857 A    2/2020
DE   102006051433 A1  5/2007
(Continued)

OTHER PUBLICATIONS

International Preliminary Report on Patentability, dated Sep. 13, 2022, for International Patent Application No. PCT/EP2021/078458. (5 pages).

(Continued)

*Primary Examiner* — Sarah A. Slifka
(74) *Attorney, Agent, or Firm* — Seed IP Law Group LLP

(57) ABSTRACT

A fuel cell device with a fuel tank which has a fuel supply line which is branched into fuel portion supply lines, having a plurality of fuel cell stacks which stacks each have, on the anode inlet side, a fuel connection which is respectively fluidically connected to one of the fuel portion supply lines. Exclusively one of the fuel cell stacks is connected on the anode outlet side to a fuel recirculation line. The flow guidance of the fuel recirculation line is selected in such a way that the fuel can be returned exclusively into the fuel cell stack connected to the fuel recirculation line. Furthermore, a method for operating the fuel cell device is provided.

10 Claims, 1 Drawing Sheet

(51) Int. Cl.
  *H01M 8/04225* (2016.01)
  *H01M 8/04228* (2016.01)
  *H01M 8/10* (2016.01)

(56) References Cited

FOREIGN PATENT DOCUMENTS

| | | |
|---|---|---|
| DE | 102018218638 A1 | 4/2020 |
| EP | 0269877 A1 | 6/1988 |
| KR | 20060024900 A | 3/2006 |
| WO | WO 2007087240 A2 | 8/2007 |

OTHER PUBLICATIONS

International Search Report, mailed Feb. 2, 2022, for International Patent Application No. PCT/EP2021/078458. (2 pages).

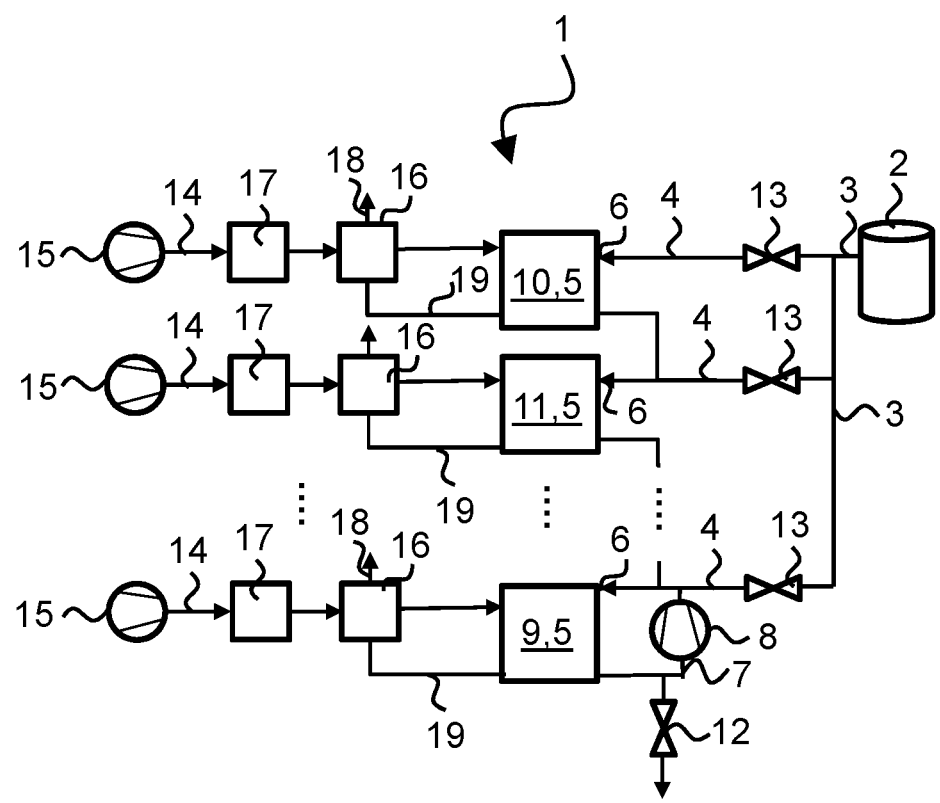

FUEL RECIRCULATION IN A FUEL CELL DEVICE HAVING A PLURALITY OF FUEL CELL STACKS

BACKGROUND

Technical Field

This disclosure relates to a fuel cell device with a fuel tank, which has a fuel supply line, which is branched into fuel portion supply lines, having a plurality of fuel cell stacks, which stacks each have a fuel connection on the anode inlet side, which is respectively fluidically connected to one of the fuel portion supply lines. The disclosure further relates to a method for operating a fuel cell device.

Description of the Related Art

Fuel cells are used to supply energy, in particular in motor vehicles. To provide the required amount of energy, a plurality of fuel cells are arranged in a fuel cell stack. To drive commercial vehicles, high power outputs are required, such that fuel cell devices for commercial vehicles preferably have a plurality of fuel cell stacks. In order to be able to operate and control these multiple fuel cell stacks individually, a structurally complex system of individual reactant supply and exhaust lines is required. In order to use the fuel efficiently, a structurally complex system of fuel recirculation lines, which are fluidically connected to the individual fuel cell stacks, is also required. This implies a high cost and complex system operation.

CN 110 828 857 A and KR 2006 0024 900 A each disclose a fuel cell device having a plurality of fuel cell stacks comprising a central fuel recirculation line, wherein the central fuel recirculation line is fluidically connected to each of the fuel cell stacks. WO 2007/087240 A2 discloses a plurality of fuel cell stacks in a fuel cell device, wherein each of the fuel cell stacks has a fuel recirculation line which is fluidically connected to the fuel supply line.

BRIEF SUMMARY

Embodiments of the present invention provide a fuel cell device and a method of operating a fuel cell device that generates high power outputs and has reduced system complexity.

According to embodiments of the present inventions, a fuel cell device is characterized in that exclusively one of the fuel cell stacks is connected on an anode outlet side to a fuel recirculation line. The flow guidance of the fuel recirculation line is selected in such a way that the fuel can be returned exclusively to the fuel cell stack connected to the fuel recirculation line. The fuel recirculation is thus considerably simplified by supplying only one stack with the recirculating fuel. This simplification also reduces costs and the space required for fuel recirculation within the fuel cell device. Furthermore, it is provided that the fuel cell device has only one single purge valve in the fuel recirculation line. In other words, it is thus sufficient that the fuel cell device has precisely one purge valve. This also reduces the costs and complexity. Similarly, the fuel cell device may have only one means of conveyance in the fuel recirculation line. This may be formed as a jet pump or as a recirculation blower.

It is, in particular, advantageous if there is a number of flow paths adapted to the number of fuel cell connections, if each of the flow paths is routed from the fuel cell tank via the fuel supply line and via one of a plurality of fuel portion supply lines to one of the fuel connections, and if exclusively the last of the fuel cell stack having the longest flow path is connected to the fuel recirculation line. If only the last fuel cell stack is connected to the fuel recirculation line, the further fuel cell stacks, which are located upstream of the last fuel cell stack, have improved operation because they are supplied with pure fuel. The fuel portion pressure is thus higher in these further fuel cell stacks, which is to say those not connected to the fuel recirculation line, which means that a higher cell voltage and efficiency can be achieved.

In an alternative embodiment, it is provided that there is a number of flow paths adapted to the number of fuel cell connections, that each of the flow paths is routed from the fuel cell tank via the fuel supply line and via one of a plurality of fuel portion supply lines to one of the fuel connections, and that only the first of the fuel cell stacks having the shortest flow path is connected to the fuel recirculation line. Here, too, the advantage is that the further fuel cell stacks which are arranged fluidically subsequent to the first fuel cell stack, which is to say downstream of the first fuel cell stack, are supplied with pure fuel and have improved operation or a higher fuel portion pressure. The further fuel cell stacks thus achieve a higher cell voltage and efficiency.

Furthermore, it is advantageous if the fuel recirculation line is fluidically connected to the fuel portion supply line of the fuel cell stack that is connected to the fuel recirculation line. This enables an efficient re-supply of the fuel into the anode chambers of the fuel cell stack which is connected to the fuel recirculation line.

In principle, however, it is also possible for one of the further fuel cell stacks, which is to say neither the first nor the last, to be connected to the fuel recirculation line.

For optimum use of the fuel in the further fuel cell stacks and to increase efficiency, it is useful if the further fuel cell stack is connected fluidically on the anode outlet side to one of the fuel portion supply lines of an adjacent fuel cell stack. This increases the hydrogen partial pressure within the further fuel cell stack and increases the efficiency of the further fuel cell stack.

The method of operating a fuel cell device is characterized by the following steps:
  a) Activation of the fuel cell stack connected to the fuel recirculation line through the supply of reactants,
  b) Operation of the fuel cell device with at least the fuel cell stack connected to the fuel recirculation line, and
  c) Deactivation of the fuel cell stack connected to the fuel recirculation line by disconnection of the supply of reactants.

In other words, the fuel cell stack that has the fuel recirculation line is always activated first. This enables safe and efficient operation of the fuel cell device. At the same time, optimum utilization of the available fuel is achieved.

Furthermore, it is advantageous if, when the fuel cell device is switched on, at least one further fuel cell stack is activated by supplying the reactants and by electrically connecting the at least one further fuel cell stack to at least one already active fuel cell stack, only after the fuel cell stack connected to the fuel recirculation line has been activated. This enables the fuel cell device to be operated with multiple fuel cell stacks and thus to be able to call up high power outputs that are required, for example, when implementing a fuel cell device in a commercial vehicle. Likewise, this allows the individual fuel cell stacks to be activated independently of each other, depending on which power output is being requested.

In this context, it is advantageous that when the fuel cell device is switched off, the further fuel cell stacks are first deactivated by disconnection of the supply of reactants and electrically disconnecting the further fuel cell stacks, this before the fuel cell stack connected to the fuel recirculation line is deactivated. In this context, it is also possible that the deactivation of individual fuel cell stacks can also take place as a function of a requested power output, such that depending on which power output is required for the vehicle, a corresponding number of fuel cell stacks in the fuel cell device are activated or deactivated.

Furthermore, it is useful if at least one of the further fuel cell stacks is operated at a higher fuel pressure than the fuel cell stack connected to the fuel recirculation line. In particular, if the last fuel cell stack is connected to the fuel recirculation line, it is provided in this context that the first fuel cell stack having the shortest of all flow paths is operated with a higher fuel pressure than the last fuel cell stack having the longest of all flow paths. Conversely, when the first fuel cell stack is connected to the fuel recirculation line, it makes sense that the last fuel cell stack having the longest of all flow paths is operated with a higher fuel pressure than the first fuel cell stack having the shortest of all flow paths. This enables optimum efficiency in the operation of the fuel cell device.

Furthermore, it is provided in this context that the fuel pressure of at least one of the further fuel cell stacks is selected in such a way that the anode outlet side fuel pressure of this further fuel cell stack corresponds to the fuel pressure of the fuel cell stack connected to the fuel recirculation line on the anode outlet side. If the last of the fuel cell stacks is connected to the fuel recirculation line, it is provided, in particular, that the fuel pressure of the first fuel cell stack having the shortest of all flow paths is selected in such a way that the anode outlet side fuel pressure of the first fuel cell stack corresponds to the anode outlet side fuel pressure of the last fuel cell stack having the longest of all flow paths. In an alternative embodiment, when the first of the fuel cell stacks is connected to the fuel recirculation line, it is advantageous if the fuel pressure of the last fuel cell stack having the longest of all flow paths is selected in such a way that the anode outlet side fuel pressure of the last fuel cell stack is equal to the anode outlet side fuel pressure of the first fuel cell stack having the shortest of all flow paths.

BRIEF DESCRIPTION OF THE SEVERAL VIEWS OF THE DRAWINGS

Further advantages, features and details of embodiments of the invention are apparent from the following description and from the drawings. Wherein:

FIG. 1 shows a fuel cell device having a plurality of fuel cell stacks.

DETAILED DESCRIPTION

The purpose of fuel cells is to generate energy and they can be applied, in particular, to generate energy for the propulsion of motor vehicles. Advantageously, a plurality of fuel cells are combined in a fuel cell stack 5.

Each of the fuel cells comprises an anode, a cathode, and a proton-conductive polymer membrane separating the anode from the cathode. The polymer membrane is formed from an ionomer, such as a polytetrafluoroethylene (PTFE) or a perfluorosulfonic acid (PFSA) polymer. Alternatively, the polymer membrane may be formed as a sulfonated hydrocarbon membrane.

A catalyst may additionally be mixed in with the anodes and/or the cathodes, the membrane may be coated on its first side and/or on its second side with a catalyst layer of a noble metal or a mixture comprising noble metals such as platinum, palladium, ruthenium or the like, which serve as reaction accelerators in the reaction of the respective fuel cell.

Fuel (for example, hydrogen) can be supplied to the anode via an anode chamber. In a polymer electrolyte membrane fuel cell (PEM fuel cell), fuel or fuel molecules are split into protons and electrons at the anode. The polymer electrolyte membrane allows the protons to pass through, but it is impermeable to the electrons. For example, the reaction: $2H_2 \rightarrow 4H^+ + 4e^-$ (oxidation/electron release) occurs at the anode. Whereas the protons pass through the polymer electrolyte membrane to the cathode, the electrons are directed to the cathode or to an energy storage device via an external circuit.

The cathode gas (for example, oxygen or oxygen-containing air) can be supplied to the cathode via a cathode chamber, such that the following reaction occurs on the cathode side: $O_2 + 4H^+ + 4e^- \rightarrow 2H_2O$ (reduction/electron uptake).

To ensure ionic conductivity for hydrogen protons through the polymer electrolyte membrane, the presence of water molecules in the polymer electrolyte membrane is required. For this reason, the cathode gas is, in particular, humidified before it is supplied to the fuel cell to bring about moisture saturation of the polymer electrolyte membrane.

FIG. 1 shows a fuel cell device 1 having a plurality of fuel cell stacks 5, 9, 10, 11 and a fuel tank 2. Such fuel cell devices 1 can be used, for example, in commercial vehicles to generate high power outputs. The fuel tank 2 has a fuel supply line 3 that is branched into fuel portion supply lines 4. The plurality of fuel cell stacks 5, 9, 10, 11 each have a fuel connection 6 on the anode inlet side. A number of fuel valves 13, adapted to the number of fuel portion supply lines 4, are coupled into the fuel portion supply lines 4. These enable the individual fuel cell stacks 5, 9, 10, 11 to be supplied with fuel independently of one another, which is to say to be operated independently of one another.

Furthermore, there is a number of flow paths adapted to the number of fuel cell connections 6. Each of the flow paths is routed from the fuel cell tank 2 via the fuel supply line 3 and via one of the fuel portion supply lines 4 to one of the fuel connections 6. In the present embodiment example, only the last of the fuel cell stacks 9, 5 having the longest flow path is connected to the fuel recirculation line 7. As can be seen in FIG. 1, this has the advantage that the entire fuel cell device 1 has only one fuel recirculation line 7, which means that only one means of conveyance 8 and only one purge valve 12 are required. The means of conveyance 8 can be a jet pump or a recirculation blower. The fuel is returned by way of the fuel recirculation line 7 through the means of conveyance 8 exclusively into the fuel portion supply line 4 of the fuel cell stack 5 connected to the fuel recirculation line 7.

In an embodiment not shown, it is also possible that it is not the last of the fuel cell stacks 5, 9 but rather the first of the fuel cell stacks 5, 10 having the shortest flow distance that is connected to the fuel recirculation line 7.

The further fuel cell stacks 11, 5 are fluidically connected on the anode outlet side to one of the fuel portion supply lines 4 of an adjacent fuel cell stack 5. This leads to an increase in fuel pressure in the respective fuel cell stack 5, 9, 10, 11.

In addition to the separate fuel connections 6 for supplying fuel to the anode chambers, the individual fuel cell stacks also have separate cathode gas connections for supplying cathode gas to the cathode chambers of the fuel cell stack 5. Here, the cathode gas connections are connected to the cathode supply line 14, which leads from the compressor 15 via an intercooler and a humidifier 16 to the fuel cell stack 9, 10, 11. Furthermore, a cathode discharge line 19 is provided, which leads to the humidifier 16. The cathode gas is drawn in by the respective compressor 15, compressed by it and supplied via the cathode supply line 14 and the intercooler 17 into the humidifier 16.

The method for operating the fuel cell device 1 is as follows. When switching on the fuel cell device 1, the fuel cell stack 5 connected to the fuel recirculation line 7, which is to say in the present embodiment the last of the fuel cell stacks 9, 5, is first activated by supplying the reactants, which is to say the fuel and the cathode gas.

Subsequent to the activation of the fuel cell stack 5 that is connected to the fuel recirculation line 7, at least one further fuel cell stack 11, 5 is activated, if required, by supplying the reactants and by electrically connecting the at least one further fuel cell stack 5, 11 to at least one already active fuel cell stack 5. The at least one further fuel cell stack 11, 5 is thereby preferably operated with a higher fuel pressure than the fuel cell stack 9, 5 connected to the fuel recirculation line 7. The fuel pressure is thereby selected in such a way that the anode outlet side fuel pressure of this at least one further fuel cell stack 11, 5 corresponds to the anode outlet side fuel pressure of the fuel cell stack 5, 9 connected to the fuel recirculation line 7. The fuel cell device 1 is now operated with the active fuel cell stacks 5, 9, 10, 11.

By activating the fuel cell stacks 5, 9, 10, 11 separately, it is possible to operate the fuel cell device 1 as a function of the requested power output. When the fuel cell device 1 is switched off, the further fuel cell stacks 11, 5 are first deactivated by disconnection of the supply of reactants and by electrically disconnecting the further fuel cell stacks 11, 5 before the fuel cell stack 9, 5 connected to the fuel recirculation line 7 is deactivated by disconnection of the supply of reactants.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A fuel cell device with a fuel tank which has a fuel supply line which is branched into a plurality of fuel portion supply lines, having a plurality of fuel cell stacks which fuel cell stacks each have, on an anode inlet side, a fuel connection which is respectively fluidically connected to one of the plurality of fuel portion supply lines, wherein exclusively one of the fuel cell stacks is connected on an anode outlet side to a fuel recirculation line, and in that a flow guidance of the fuel recirculation line is selected in such a way that fuel can be returned exclusively into the fuel cell stack connected to the fuel recirculation line.

2. The fuel cell device according to claim 1, wherein a number of flow paths adapted to the number of fuel cell connections is present, in that each of the flow paths is routed from the fuel cell tank via the fuel supply line and via one of the plurality of fuel portion supply lines to one of the fuel connections, and in that only a last one of the fuel cell stacks having a longest flow path is connected to the fuel recirculation line.

3. The fuel cell device according to claim 1, wherein a number of flow paths adapted to the number of fuel cell connections is present, in that each of the flow paths is routed from the fuel cell tank via the fuel supply line and via one of the plurality of fuel portion supply lines to one of the fuel connections, and in that only a first of the fuel cell stacks having a shortest flow path is connected to the fuel recirculation line.

4. The fuel cell device according to claim 1, wherein the fuel recirculation line is fluidically connected to the fuel portion supply line of the fuel cell stack that is connected to the fuel recirculation line.

5. The fuel cell device according to claim 1, wherein each of the other fuel cell stacks is fluidically connected on an anode outlet side to one of the plurality of fuel portion supply lines of an adjacent fuel cell stack.

6. A method of operating a fuel cell device with a fuel tank which has a fuel supply line which is branched into a plurality of fuel portion supply lines, and having a plurality of fuel cell stacks which fuel cell stacks each have, on an anode inlet side, a fuel connection which is respectively fluidically connected to one of the plurality of fuel portion supply lines, wherein exclusively one of the fuel cell stacks is connected on an anode outlet side to a fuel recirculation line, and in that a flow guidance of the fuel recirculation line is selected in such a way that fuel can be returned exclusively into the fuel cell stack connected to the fuel recirculation line, the method comprising:
  a) activation of the fuel cell stack connected to the fuel recirculation line through the supply of reactants,
  b) operation of the fuel cell device with at least the fuel cell stack connected to the fuel recirculation line, and
  c) deactivation of the fuel cell stack connected to the fuel recirculation line by disconnection of the supply of reactants.

7. The method according to claim 6, wherein, when the fuel cell device is switched on, at least one further fuel cell stack is activated only by supplying the reactants and by electrically connecting the at least one further fuel cell stack to at least one already active fuel cell stack after the fuel cell stack connected to the fuel recirculation line has been activated.

8. The method according to claim 7, wherein, when the fuel cell device is switched off, the at least one further fuel cell stack is first deactivated by disconnection of the supply of reactants and by electrically disconnecting the at least one further fuel cell stack before the fuel cell stack connected to the fuel recirculation line is deactivated.

9. The method according to claim 7, wherein the at least one further fuel cell stack is operated at a higher fuel pressure than the fuel cell stack connected to the fuel recirculation line.

10. The method according to claim 7, wherein the fuel pressure of the at least one further fuel cell stack is selected in such a way that an anode outlet side fuel pressure of the at least one further fuel cell stack corresponds to an anode outlet side fuel pressure of the fuel cell stack connected to the fuel recirculation line.

* * * * *